April 25, 1967 M. E. JONES 3,316,347

PENETRATION DISPLAY SYSTEM INCLUDING SHIFT OF COLOR BALANCE BETWEEN MONOCHROME AND COLOR RECEPTION

Filed June 15, 1965 2 Sheets-Sheet 1

United States Patent Office 3,316,347

Patented Apr. 25, 1967

3,316,347

PENETRATION DISPLAY SYSTEM INCLUDING SHIFT OF COLOR BALANCE BETWEEN MONOCHROME AND COLOR RECEPTION

Morton E. Jones, Richardson, Tex., assignor to Texas Instruments Incorporated, Dallas, Tex., a corporation of Delaware Filed June 15, 1965, Ser. No. 464,077

6 Claims. (Cl. 178—5.4)

Figure 1:
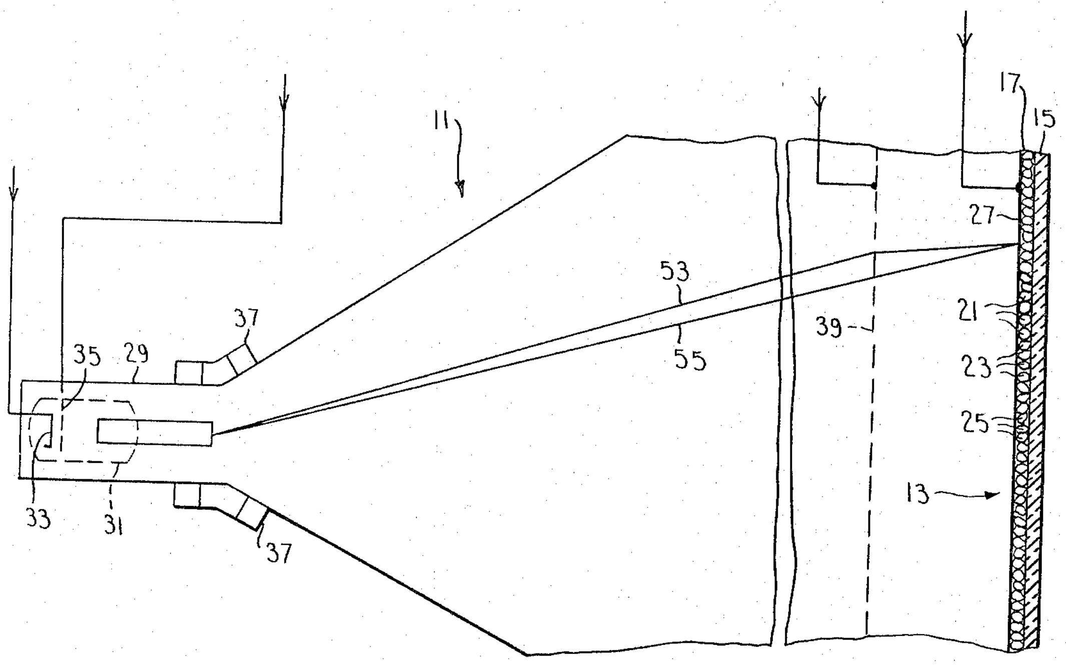

This invention relates to image display systems and more particularly to such a system for displaying color images or black and white images alternatively.

Various color systems have been proposed for the two-color presentation of polychromatic color images. Prominent among these are those which use red and white component images. For use in television, it is highly desirable that the display system be compatible so that black and white images can also be displayed. For example, the presently standard NTSC broadcasting system uses a form of compatible transmission so that either black and white or color images may be sent or received on standard equipment. However, it has been found that the color balance of the white light which produces the best color reproduction in two-color presentations is not the best balance for black and white reproduction. For color image displays a warm white is optimum while for black and white image displays a cool color balance is preferred.

Among the several objects of the invention may be noted the provision of a system for alternatively displaying color images and black and white images and which provides a shifted color balance for the display of black and white images relative to the substantially warm white or warm achromatic light provided in the color image display; the provision of such a system in which the shifted black and white color balance is obtained automatically when only black and white or luminance information is available for display; the provision of such a system in which black and white images are displayed in substantially cool white or cool achromatic light; the provision of such a system which is operable in conjunction with the compatible NTSC standard system of color telecasting; the provision of such a system which permits the cumulative energization of phosphors which emit light of different hues; the provision of such a system utilizing a two-color display of polychromatic images; and the provision of such a system which is relatively simple and inexpensive in construction and which is reliable in operation. Other objects and features will be in part apparent and in part pointed out hereinafter.

Briefly, the display system of this invention includes a viewing screen having a first phosphor which emits light of relatively long wavelengths when energized and a second phosphor which emits light of a color substantially complementary to that emitted by said first phosphor, the two phosphors when energized simultaneously emitting substantially warm achromatic light. The screen also includes a third phosphor which when energized emits light of relatively short wavelengths, the three phosphors when energized simultaneously emitting substantially cool achromatic light. The system also includes electron gun means for energizing the phosphors and circuitry for controlling the gun means, the circuitry including means for energizing the first phosphor in response to a first color signal, means for energizing the first and second phosphor in response to a second color signal and means for energizing all three phosphors only in response to a black and white signal present in the absence of color signals. Thus, color images are displayed using the first and second phosphors and black and white images are displayed using all three phosphors energized simultaneously.

The invention accordingly comprises the apparatus hereinafter described, the scope of the invention being indicated in the following claims.

Figure 2:
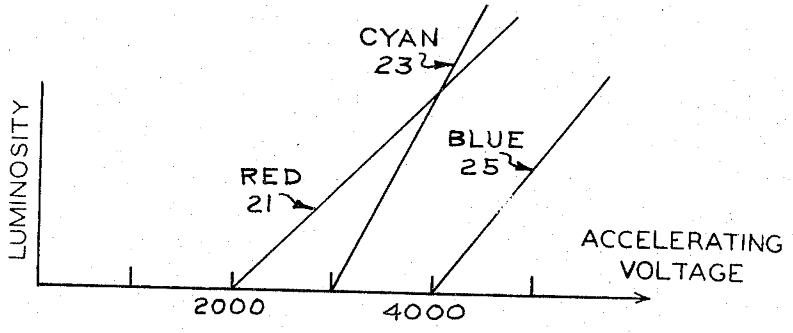
Figure 3:
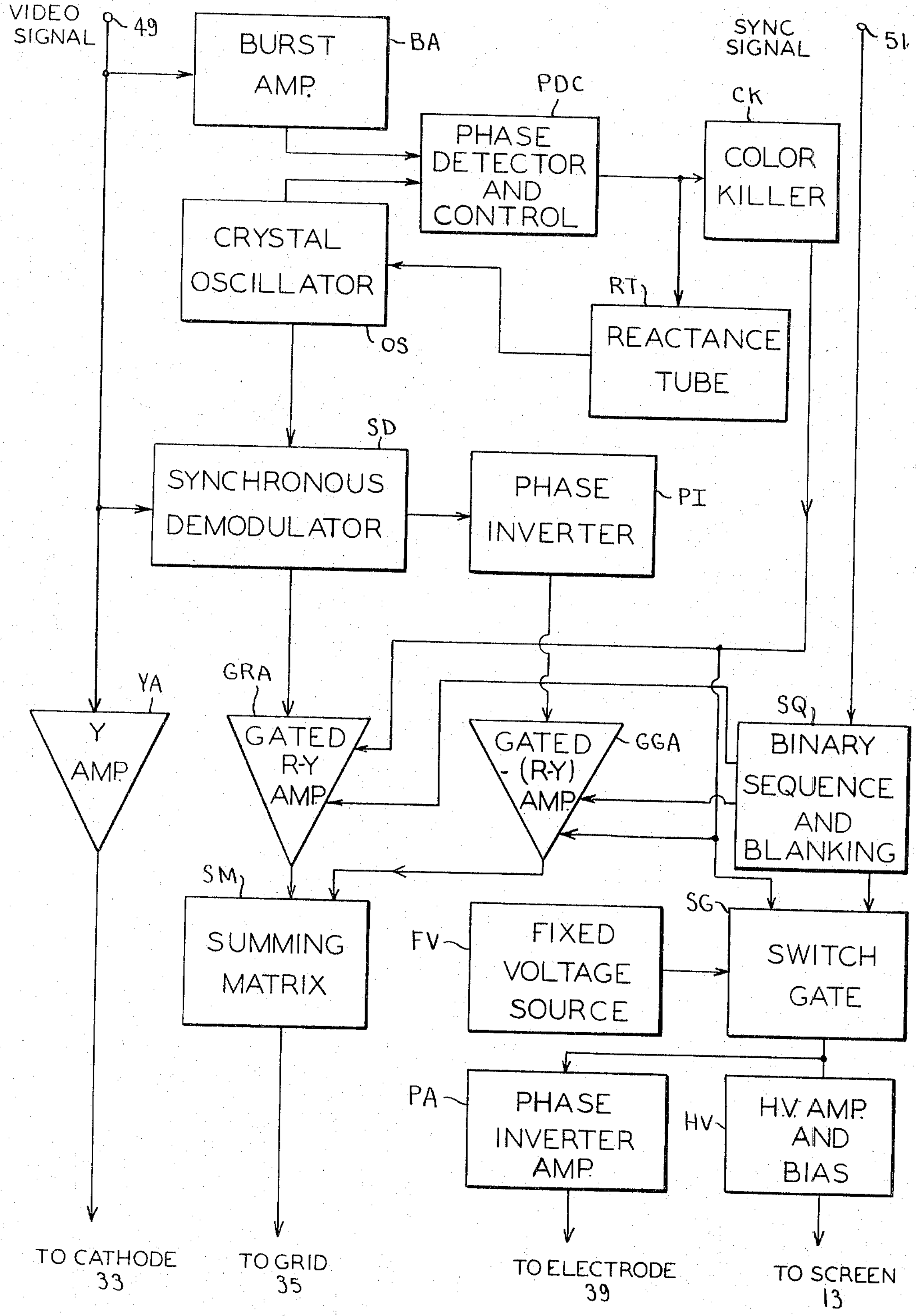

In the accompanying drawings in which one of various possible embodiments of the invention is illustrated, FIGURE 1 shows diagrammatically, in section, a kinescope for the alternative display of either color or black and white images;

FIGURE 2 is a graph representing the responses of three phosphors included in the viewing screen of the kinescsope of FIGURE 1 to electron beams of different energies; and FIGURE 3 is a block diagram illustrating portions of a television receiver for controlling the operation of the kinescope of FIGURE 1.

Corresponding reference characters indicate corresponding parts throughout the drawings.

Referring now to FIGURE 1 there is shown a kinescope 11 which includes a viewing screen indicated generally at 13. The viewing screen includes a transparent glass face plate 15 the inner surface of which is coated with a phosphor layer 17. Phosphor layer 17 is constituted by a random mixture of phosphor particles 21, 23 and 25 which, when energized by appropriate electron beams, emits light of respectively different colors. Particles 21 emit red light when energized while the particles 23 and 25 emit cyan and blue light respectively. Phosphor layer 17 is in turn coated with an electron-permeable aluminum film 27 by means of which an electron beam accelerating voltage can be applied to screen 13 as described hereinafter.

It is to be understood that the cyan phosphor particles 23 referred to herein may comprise a mixture of blue and green phosphor particles which when energized together emit light which to an observer appears to be cyan. Thus, as used herein, the term "cyan phosphor" can include particles of a material which emits cyan light and also mixtures of two or more materials which together emit cyan light.

Phosphor particles 21, 23 and 25 are differently responsive to electron beams of differing energies. This is illustrated in FIGURE 2 wherein the luminosities of the different phosphors are represented as functions of varying electron accelerating voltage. The responses of the different phosphors are such that each has a different threshold of electron energy which must be exceeded before that phosphor is energized. An electron beam accelerated by a 3,000 volt accelerating potential will energize only the red phosphor particles 21 while electrons accelerated by a 4,000 volt field will energize both the red and the cyan (23) particles. Since cyan is complementary in color to red, the simultaneous energization of both phosphors 21 and 23 will produce a white or substantially achromatic light. The ratio and characteristics of the phosphors 21 and 23 are chosen so that the white produced by their simultaneous energization is in fact a warm white, such a white being more suitable for the two-color display of polychromatic color images than a cool white.

Electrons accelerated to 5,000 volt energies will excite all three kinds of phosphors thereby producing a white light which, though it is still substantially achromatic, has a generally cool cast. The concentration and character of the blue phosphor 25 is chosen to optimize the color balance of the cumulatively energized phosphors for a pleasing display of black and white images.

The differences in the response functions of the different phosphor particles is, for example, obtained by providing differences in their surface characteristics, the surfaces of at least the particles 23 and 25 being provided with energy-dissipating barrier layers. As indicated by the graph of FIGURE 2, the barrier layers raise the energy threshold which must be overcome before energization of the phosphor is effected. An appropriate coating material for establishing the barrier layer is silicon dioxide. Coatings of silicon dioxide are applied to the cyan (23) and blue (25) phosphor particles by suspending them in an atmosphere of tetraethoxysilane and oxygen at an elevated temperature. A heavier coating is applied to the blue particles 25. Alternatively, all three kinds of particles can be coated with the coatings being graded in thickness to produce the desired energy thresholds.

Kinescope 11 also includes a neck portion 29 within which is mounted an essentially conventional electron beam gun 31. Gun 31 includes a cathode 33 which emits electrons when heated by a suitable heater (not shown). The number of electrons which are emitted from gun 31 as a beam, i.e., the beam current or intensity, is controlled or modulated by a grid 35 in conventional manner. The electron beam emitted from gun 31 is deflected to scan viewing screen 13 by a conventional deflection yoke 37 which includes both horizontal and vertical deflection coils and which is driven by conventional deflection circuitry (not shown). Kinescope 11 also includes a deflection compensation electrode 39 which is constituted by an open grid or mesh spaced from screen 13 toward gun 31.

The apparatus illustrated in FIGURE 3 for controlling kinescope 11 is constructed for using video signals conforming to the presently standard NTSC system of color television broadcasting. This is a so-called compatible system of broadcasting in which the video signal is constituted by luminance information which occupies a substantially 4 megacycle bandwidth and chrominance information which is modulated on a 3.58 megacycle subcarrier. The chrominance information is thus substantially interlaced with the luminance information over the available bandwidth.

The saturation information is carried on the subcarrier as amplitude modulation while the hue information is represented by the phase of the subcarrier (if any) relative to a reference or timing signal. Accordingly, the chrominance information can be taken as a vector quantity, the angular position of which represents hue and the magnitude of which represents saturation. The timing signal is the so-called "color burst" which is employed to synchronize a local oscillator. The color burst is omitted during black and white transmissions so that its presence or absence is a reliable indication as to whether black and white or color signals are being transmitted.

In FIGURE 2 the video signal is applied at the terminal 49. The steps taken in obtaining the video signal, e.g., R.F. amplification, frequency conversion, I.F. amplification and detection, are conventional and, since they involve no part of the present invention, are not further explained herein. The luminance information (Y) in the video signal is amplified in a luminance amplifier YA and is applied to the cathode 33 of gun 31 in the appropriate phase.

The video signal is also applied to a keyed burst amplifier BA which selectively amplifies the 3.58 megacycle color burst. The amplified color burst is applied, along with the output signal from a crystal oscillator OS, to a phase detector and control circuit PDC. The phase control circuit detects the color burst and drives a reactance tube RT which is interconnected with the crystal oscillator OS to vary the oscillator frequency over a small range. These elements thus constitute a servo loop which, in conventional manner, tends to hold the frequency of oscillation of the crystal oscillator OS at a fixed phase relative to the color burst contained in the video signal. The phase detector and control circuit also control a color killer circuit CK in conventional manner for purposes described hereinafter.

The phase-locked 3.58 megacycle signal provides a continuing time base which facilitates detection of the phase modulation information carried by the NTSC chrominance subcarrier. The oscillator signal and the video signal are applied to a synchronous demodulator SD which demodulates the color subcarrier on a single phase axis only thereby to yield substantially the red minus luminance $(R-Y)$ signal. The $R-Y$ signal is also passed through a phase inverter PI to obtain the inverse signal $-(R-Y)$, which is used in obtaining a short wavelength record or signal.

The $R-Y$ and $-(R-Y)$ signals are amplified in gated amplifiers, GRA and GGA respectively, which selectively block or pass the amplified signal. Gated amplifiers GRA and GGA are controlled by both a binary sequencing and blanking circuit SQ and the color killer circuit CK. The output signals from the amplifiers GRA and GGA are combined in a summing matrix SM and the sum of these signals is applied to the grid 35 of electron beam gun 31. When color signals are being received so that the color killer circuit CK does not affect gated amplifiers GRA and GGA, the sequencing circuit SQ controls these amplifiers so that only one of them passes its respective amplified signal to summing matrix SM at any one time, the signal from the other gated amplifier being blanked. Thus, during color reception, the grid 35 receives the $R-Y$ and $-(R-Y)$ signals alternately. The sequencing circuit SQ is operated under the control of a synchronization signal applied at terminal 51.

According to the present NTSC standards both vertical and horizontal synchronization signals are transmitted along with the luminance and chrominance information. These signals are employed at the receiving apparatus to control the horizontal and vertical deflection of the electron beam to scan the viewing screen. As the method of obtaining these signals is conventional, it is not described further herein. In the following description it is assumed that the vertical synchronization signal is applied at the terminal 51.

With the sequencing circuit SQ under the control of the vertical synchronization signal, the signal applied to grid 35 alternates between the $R-Y$ and $-(R-Y)$ signals on alternate fields of scanning. As is understood by those skilled in the art, the electron beam current from the gun is modulated as a function of the sum of the signals applied to the grid and cathode. Thus, on every other scanning field, the beam intensity is controlled by the sum of the Y and $R-Y$ signals, which sum constitutes a red or long wavelength record of the original scene being broadcast. On the alternate fields, the beam intensity is controlled by the sum of the Y and $-(R-Y)$ signals, which sum constitutes a relatively short wavelength record of the original scene, that is, somewhere between the green and the blue.

The sequencing circuit SQ also generates a signal which, during color reception, is passed by a switching gate SG to control a high voltage amplifier and bias circuit HV and a phase inverting amplifier PA. When controlled by the sequencing circuit SQ, amplifier HV applies an electron beam accelerating voltage to screen 13, which accelerating voltage alternates between two preselected levels in synchronism with the gating of the amplifiers GRA and GGA. The lower of these two voltage levels imparts to the electron beam only sufficient energy to excite the red light emitting phosphor particles 21, while the higher voltage level imparts sufficient energy to the electron beam to excite both the red light emitting phosphor particles 21 and the cyan light emitting phosphor particles 23.

The switching is controlled so that the lower voltage level occurs when the intensity of the beam is being modulated in accordance with the long wavelength record and the higher voltage level is present when the beam intensity is being modulated in accordance with the short wavelength record. Thus the long wavelength record will produce red component images on screen 13 and the short wavelength record will produce substantially white component images on alternate fields with the red images.

While a field sequential color display has been illustrated, it is to be understood that a line sequential display can be produced by gating the color signals and switching the accelerating voltage at the line scanning rate. In such a case, the horizontal synchronization signal is applied at terminal 51. Similarly a dot sequential display can be applied by providing a relatively high frequency switching signal.

While the variations in the accelerating voltage have the desired effect of controlling the color of the images formed by the electron beam at different energies, they also affect the registration between the different component images. The electron beam will not be deflected equally by the same magnetic field generated by yoke 37 when it is accelerated by different voltages. To compensate for these variations in deflection so that registration is maintained, a voltage which is an inverse function of the total electron beam gun accelerating voltage is applied to electrode 39 by the phase inverting amplifier PA. The effect of compensating electrode 39 when so operated is illustrated in FIGURE 3 by the lines 53 and 55. The lines 53 and 55 represent, for a given magnetic deflection, the paths of the electron beam when accelerated by the relatively high and low total accelerating voltages respectively used in color image presentation. At the higher of these two accelerating voltages, the signal applied to electrode 53 reduces the electric field between gun 31 and the electrode. The electrons thus move at a lower velocity and are subjected to a greater magnetic deflection, as indicated by the corresponding portion of the line 53. After passing through the grid-like electrode 39, the electrons following beam path 53 are subjected to a strong electric field, due to the high accelerating voltage remaining to be traversed, and hence change direction so that they approach the screen more directly.

At the lower of these two accelerating voltages, however, electrode 39 increases the voltage between gun 31 and the electrode, so that the electron beam is deflected less and hence traverses the path indicated by the corresponding portion of the line 55. Upon passing through electrode 39, the electrons following beam path 55 are exposed only to a relatively weak electric field since the screen 13 is at its lower voltage level. Hence, the beam is not substantially further deflected. By proper choice of the relative magnitude of the voltage applied to electrode 39 in relation to the total accelerating voltage and to the spacing of the electrode from screen 13, the beam paths 53 and 55 are caused to converge as illustrated. Thus, the total deflection experienced by the electron beam in reaching the screen is rendered unaffected by the variations in electron accelerating voltage which are employed to control image color.

In summary, it is seen that on successively scanned fields the electron beam intensity is modulated in accordance with long and short wavelength records alternately, and that these records produce red and substantially warm white images respectively which are in registry on screen 53. When so presented at the rapid field sequential rate, these component images blend into a composite image which subjectively appears to include a full range of hues, even though a colorimetric analysis of the composite image would reveal differences in color as compared with the original scene. This general two-color system of presenting polychromatic images is known in the art and provides a pleasing appearance in which the hues appear more saturated than they really are. This effect is accentuated by optimizing the relative concentrations and characteristics of the red and cyan phosphors thereby to achieve a warm white when both are energized.

The output signal from the phase detector and control circuit PDC is highly dependent upon the presence of the so-called color burst within the video signal. Accordingly, this output signal is employed to control the color killer circuit CK which determines whether the received image is displayed in the color mode or in the black and white mode. Color killer circuit CK is switched by the phase detector PDC between a first state which exists when color signals are present and a second state which exists when no color signals are present, i.e., during black and white television transmission. In the first state, the color killer circuit CK does not affect the gating of the amplifiers GRA and GGA thereby leaving them under the sole control of the binary sequence and blanking circuit SQ which passes the $R-Y$ and $-(R-Y)$ signals on alternate scanning frames as explained previously. The color killer circuit CK also controls the gate SG so that, in the first state, the high voltage amplifier circuit HV and the phase inverting amplifier PA are also under the control of the binary sequence circuit SQ.

In the second state, that is, during black and white reception, the color killer circuit CK cuts off both amplifiers GRA and GGA thereby suppressing any noise signals which might otherwise be applied to the grid 35. Thus the electron beam intensity is modulated solely in accordance with the luminance (Y) information. In this second state color killer CK also operates gate SG so as to place the high voltage amplifier HV and phase inverting amplifier PA under the control of a fixed voltage source FV.

The voltage level provided by the fixed source FV drives the high voltage amplifier HV to produce an accelerating voltage at the screen 13 which is above the energization thresholds of all of the phosphors 21, 23 and 25, e.g., 5000 volts. Accordingly, when black and white signals are being received, the intensity of the electron beam will be modulated solely in accordance with the luminance information and the electrons will be accelerated to such an energy that the image produced is displayed in cool white light the color balance of which is optimized for the presentation of black and white images.

While time sharing of a single gun at different energy levels is shown, it should also be understood that multiple guns could be used to provide the different component images. Also, while automatic operation of the color killer circuit is illustrated, these functions may in the alternative be provided by manual switching.

In view of the above, it will be seen that the several objects of the invention are achieved and other advantageous results attained.

As various changes could be made in the above apparatus without departing from the scope of the invention, it is intended that all matter contained in the above description or shown in the accompanying drawings shall be interpreted as illustrative and not in a limiting sense.

What is claimed is:

1. An image display system for producing a multicolor image in response to a plurality of color signals and for producing a black and white image in response to a black and white signal, said system comprising:

a viewing screen including a first phosphor which when energized emits light of relatively long wavelengths, a second phosphor which when energized emits light of a color substantially complementary to that emitted by said first phosphor, said two phosphors when simultaneously energized emitting substantially warm achromatic light, and a third phosphor which when energized emits light of relatively short wavelengths, said three phosphors when simultaneously energized emitting substantially cool achromatic light;

electron beam gun means for energizing said phosphors; and circuit means for controlling said gun means, said circuit means including means for energizing said first phosphor in response to a first color signal, means for energizing said first and second phosphors in response to a second color signal, and means for energizing said first, second and third phosphors in response only to a black and white signal present in the absence of color signals whereby color images are displayed using said first and second phosphors and black and white images are displayed using all three phosphors energized simultaneously.

2. An image display system for producing a multicolor image in response to luminance information and color information and for producing a black and white image in response to luminance information alone, said system comprising:

a viewing screen including a first phosphor which when energized emits light of relatively long wavelengths, a second phosphor which when energized emits light of a color substantially complementary to that emitted by said first phosphor, said first and second phosphors being differently responsive to electron beams of differing energies within a predetermined range, said two phosphors when simultaneously energized emitting substantially warm achromatic light; and a third phosphor which when energized emits light of relatively short wavelengths, said third phosphor being responsive only to electron beams of energies above said range, said three phosphors when simultaneously energized emitting substantially cool achromatic light;

electron beam gun means for energizing said phosphors;

means responsive to said luminance information for varying the quantity of electrons emitted by said gun means;

voltage supply means operative in one state to provide at least two electron beam accelerating voltages within said range for energizing said first and second phosphors and operative in another state to provide an electron beam accelerating voltage which is above said range for energizing all of said phosphors;

means operative when said supply means is in said first state and responsive to said color information when present for varying the relative quantities of electrons emitted by said gun at the different voltages within said range; and means for selectively changing said supply means between said one state for displaying color images using said first and second phosphors and said another state for displaying black and white using all three phosphors energized simultaneously.

3. An image display system for producing a multicolor image in response to a plurality of color signals and for producing a black and white image in response to a black and white signal, said system comprising:

a viewing screen including a first phosphor which when energized emits light of relatively long wavelengths, a second phosphor which when energized emits light of a color substantially complementary to that emitted by said first phosphor, said first and second phosphors being differently responsive to electron beams of differing energies within a predetermined range, said two phosphors when simultaneously energized emitting substantially warm achromatic light; and a third phosphor which when energized emits light of relatively short wavelengths, said third phosphor being responsive only to electron beams of energies above said range, said three phosphors when simultaneously energized emitting substantially cool achromatic light;

electron beam gun for energizing said phosphors;

means responsive to the presence of color signals for providing at least two electron beam accelerating voltages within said range;

means responsive to said color signals when present for varying the relative quantities of electrons emitted by said gun means at the different voltages within said range; and means responsive to the absence of color signals for providing an electron beam accelerating voltage which is above said range for energizing all of said phosphors whereby color images are displayed using said first and second phosphors and black and white images are displayed using all three phosphors energized simultaneously.

4. An image display system for producing a multicolor image in response to a plurality of color signals and for producing a black and white image in response to a black and white signal, said system comprising:

a viewing screen including a first phosphor which emits substantially red light when energized by electrons having energies of at least a first predetermined value, a second phosphor which emits substantially cyan light when energized by electrons having energies of at least a second predetermined value, and a third phosphor which emits substantially blue light when energized by electrons having energies of at least a third predetermined value, said third value being greater than said first and second values;

means responsive to the presence of color signals for providing electron beam accelerating voltages producing electron energies of said first and second values;

means responsive to the color signals when present for varying the relative quantities of electrons emitted by said gun means at said first and second values; and means responsive to the absence of color signals for providing an electron beam accelerating voltage producing electron energies above said third value thereby to energize all of said phosphors and for varying the quantities of electrons emitted by said gun means at said energies above said third level in accordance with the black and white signal whereby color images are displayed using said first and second phosphors and black and white images are displayed using all three phosphors energized simultaneously.

5. A color television receiver for use in a compatible color broadcasting system in which a carrier wave is modulated by a luminance signal and a chrominance signal, said chrominance signal being omitted when black and white signals are being broadcast, said receiver comprising:

a viewing screen including a first phosphor which when energized emits light of relatively long wavelengths, a second phosphor which when energized emits light of a color substantially complementary to that emitted by said first phosphor, said first and second phosphors being differently responsive to electron beams of differing energies within a predetermined range, said two phosphors when simultaneously energized emitting a substantially warm achromatic light, and a third phosphor which when energized emits light of relatively short wavelengths, said first phosphor being responsive only to electron beams of energies above said range, said three phosphors when simultaneously energized emitting substantially cool acromatic light;

electron beam gun means;

means for detecting said luminance signal;

means for modulating the quantity of electrons emitted by said gun means as a function of said luminance signal;

means for detecting said chrominance signal;

means for varying the quantities of electrons emitted by said gun means at various energies within said range in response to said chrominance signal when present; and means for providing electron energies greater than said range when no chrominance signal is present whereby when black and white signals are being broadcast, they will be displayed in relatively cool achromatic light.

6. A color television receiver for use in the NTSC color broadcasting system, said receiver comprising:

a fluorescent screen including a first phosphor which when energized emits substantially red light, a second phosphor which when energized emits substantially cyan light, said first and second phosphors being differently responsive to electron beams of different energies within a predetermined range, said two phosphors when simultaneously energized emitting a substantially warm achromatic light, and a third phosphor which when energized emits substantially blue light, said third phosphor being responsive only to electron beams of energies above said range, said three phosphors when simultaneously energized emitting substantially cool achromatic light;

electron beam gun means;

means for detecting the NTSC luminance signal;

means for modulating the quantity of electrons emitted by said gun means as a function of said luminance signal;

means for detecting the NTSC chrominance signal;

means for accelerating electrons emitted by said gun means at different voltages to provide different energies within said range when said chrominance signal is present;

means for varying the relative quantities of electrons emitted by said gun means at various energies within said range in response to said chrominace signal when said chrominance signal is present; and means for accelerating electrons emitted from said gun means at an accelerating voltage providing electron energies above said range when no chrominance signal is present whereby when black and white signals are being broadcast, they will be displayed in relatively cool achromatic light.

References Cited by the Examiner

UNITED STATES PATENTS

| | | | |
|---|---|---|---|
| 2,954,426 | 9/1960 | Kroger | 178—5.4 |
| 3,135,824 | 6/1964 | Boothroyd | 178—5.4 |
| 3,242,260 | 3/1966 | Cooper et al. | 178—5.4 |
| 3,271,512 | 9/1966 | Daw | 178—5.4 |

DAVID G. REDINBAUGH, *Primary Examiner.*

J. A. O'BRIEN, *Assistant Examiner.*